Nov. 1, 1938.　　　F. D. LEWIS　　　2,135,403
EMERGENCY TIRE TOOL
Filed Feb. 18, 1938
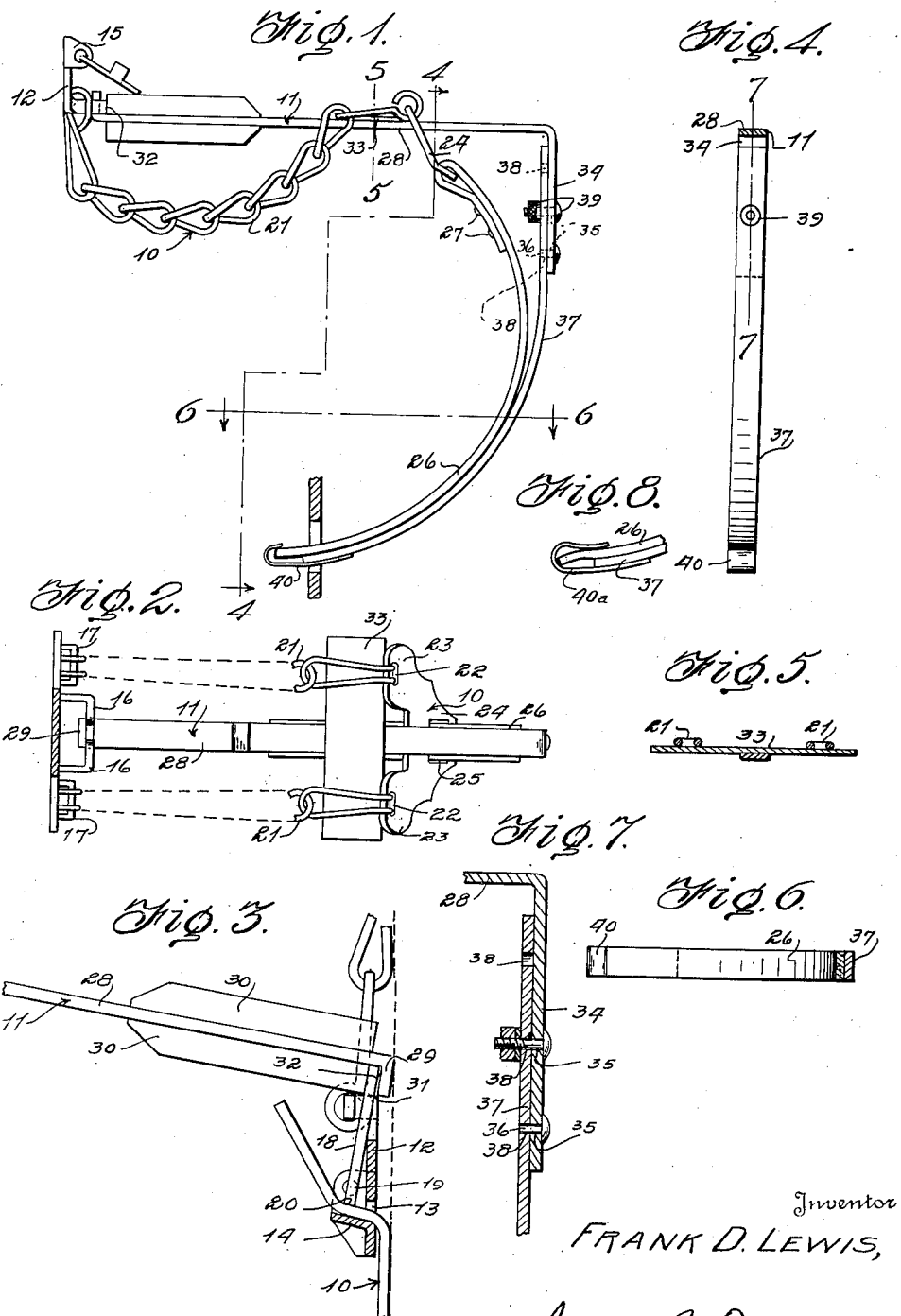
Inventor
FRANK D. LEWIS,
By Ivan P. Tashof
Attorney Patented Nov. 1, 1938

2,135,403

UNITED STATES PATENT OFFICE 2,135,403

EMERGENCY TIRE TOOL

Frank D. Lewis, West Orange, N. J., assignor, by direct and mesne assignments, to Rhoda Faffer, Perth Amboy, N. J., as trustee Application February 18, 1938, Serial No. 191,295

14 Claims. (Cl. 81—15.8)

The present invention relates to tools for applying tire chains.

A form of tire chain frequently used in emergencies and commonly known as an emergency chain consists of a pair of short chains connected at their ends by cross bars. From one bar extends a suitable strap usually of fabric and the other cross bar is provided with clamping means for the strap. These chains are applied by passing the strap around the tire so that the chains lie on the tire tread transversely thereof. The strap is then passed through the clamping means, drawn taut and held by the clamp.

In so applying the chain without the use of tools, it is practically impossible to prevent soiling of the hands and clothing.

One important object of the present invention is to provide a novel tool adapted to support and hold such an emergency chain during application, the tool being provided with a handle and being so constructed and arranged as to afford means for carrying the strap around the tire and bring its end forward into position where it may be readily grasped without one's hands or clothing coming into contact with the tire or any other part of the vehicle.

A second important object of the invention is to provide a novel tool for this purpose which can be adjusted to accommodate variations in the lengths of the chains and especially of the strap portion of such chains.

A third important object of the invention is to provide such a tool with means to hold the clamp end of the chain, the means being of such construction that it may also be used for actuating the clamp to cause it to grip the strap upon application of the emergency chain to a tire.

With the above and other objects in view, the invention consists in general of certain novel details of construction and combinations of parts hereinafter fully described, illustrated in the accompanying drawing and particularly pointed out in the claims.

In the accompanying drawing, like characters of reference indicate like parts in the several views, and:—

Figure 1 is a side elevation of the invention with an emergency chain supported thereon.

Figure 2 is a broken plan view thereof.

Figure 3 is a fragmentary side elevation of the handle portion of the tool showing the manner of its use in tightening the clamp of the emergency chain.

Figure 4 is a section on the line 4—4 of Fig. 1.

Figure 5 is a section on the line 5—5 of Fig. 1.

Figure 6 is a section on the line 6—6 of Fig. 1.

Figure 7 is a section on the line 7—7 of Fig. 4.

Figure 8 is a side elevation of a modified strap holding hook.

The type of emergency chain commonly used and for which the present invention is particularly adapted is indicated generally at 10 and the tool itself is indicated generally at 11.

The emergency chain includes a clamp comprising a flat plate forming a body 12 having a transverse slot 13 adjacent one edge and an inclined lip 14 extends from the body 12 at the edge of this slot nearer the said edge. A pair of ears 15 are carried by the body 12, these ears extending at right angles to the body and being located at the opposite side edges thereof. Extending from the face of the body is a pair of confronting L-shaped lugs 16 spaced on opposite sides of the center line of the body 12. Chain loops 17 are fixed to the body 12 on opposite sides of the pair of lugs 16. A clamping tongue 18 is provided with laterally projecting opposed trunnions or journals 19 adjacent one end, and these trunnions or journals fit on the ears 15 so that the tongue is pivoted to the body in such manner that its pivotal action biases the short end 20 of the tongue toward and from the lip 14. Extending from the loop 17 is a pair of chains 21 each having one end connected to a respective loop 17 and its other end connected to an opening 22 formed in one arm 23 of a plate 24 of general Y-shape. The stem of this plate 24 is provided with a transverse slot or opening 25 wherethrough passes one end portion of a strap 26, the end being doubled back to form a loop and being secured by rivets 27 or the like. This strap is of proper size to pass through the slot 13 and is of proper thickness to be gripped between the tongue end 20 and lip 14 upon the tongue 18 being rotated to bias the end 20 towards said lip.

The tool includes a straight metal bar 28 forming the tool body. One end of this bar is turned up at right angles to the body to form a hook 29. Handle sections 30 are secured to opposite faces of the body 28 in such position that a space 31 forming a wrench jaw is provided between the hook 29 and the squared end 32 of one of the handle sections. A chain support in the form of a transverse bar 33 is fixed to the body 28 intermediate its ends. At the end opposite the hook 29 the bar extends downwardly at right angles to the body as at 34 to form the upper section strap support. This portion 34 is provided with a pair of spaced openings 35. Fixed in the lower hole is a stud or dowel 36. The strap support also includes a lower section 37 of bar metal having a straight upper end portion and a lower end portion curved toward the handle end of the tool. The upper portion of the member 37 is provided with a series of holes 38 spaced at the same distance as the holes 35 and, in assembling the device, the dowel 36 is inserted in one of the holes 38 and the bolt 39 is inserted through the next hole 38 above the dowel. Fixed to the under side of the lower end of the member 37 is a strap hook 40 comprising a bent flat strip preferably of spring metal for engaging and holding the end of the strap 26, as shown in Figure 1.

In the modification shown in Figure 8, a strap holding hook 40a, preferably made of spring metal, is bent similarly to hook 40 and extended so as to form a spring clamp with the lower end of strap supporting bar 36. This clamp will serve to prevent the strap 26 from slipping during the use of the tool.

In using the device, the body 28 is seated between the arms 23 of the plate 24 with the strap beneath the body 28. The chains are arranged to rest on the bar 33 and the hook 29 is engaged between the lugs 16, as in Figure 2. The strap is now led around the concave face of the member 37 and its end engaged in the hooks 40 or 40a. The emergency chain is now ready for application. To apply the emergency chain, the member 37 is passed to the inner side of the tire with the body 28 extending transversely of the tire. The member 37 then has its hook end passed between the wheel spokes or through one of the wheel center openings provided in many disc wheels, the passage being effected from the inner to the outer side of the wheel so that the end of the strap is positioned for convenient grasping. The strap end is now removed from the hook 40 and the strap pulled forwardly. Next the chains are pushed off the bar 33 and the clamp released from the hook 29. The tool may now be removed as it is free from the emergency chain. The strap is now passed through the slot 13 and pulled taut and the tongue 18 is rotated to cause gripping of the strap between the end 20 and lip 14, this operation being facilitated by engaging the tongue end, as in Figure 3, in the gap 31, the tool thus acting as a lever. Obviously, this operation is effected without it being necessary for the dirty tire to come in contact with one's hands or clothing.

There has thus been provided a simple and efficient device of the kind described and for the purpose specified.

It is obvious that changes may be made in the form and construction of the invention without departing from the material inventive principles. It is not, therefore, desired to confine the invention to the form herein shown and described, but it is desired to include all forms which come within the scope of the appended claims.

What is claimed is:—

1. A tool for applying emergency tire chains of the type having a clamp at one end and a strap at the other for engaging with said clamp, said tool comprising an elongated body and a rebent strap supporting member extending downwardly from one end of said body and curved backwardly toward the other end of the body, said member being arranged to extend downwardly and outwardly around a tire upon the tool being in use.

2. A tool for applying emergency tire chains of the type having a clamp at one end and a strap at the other for engagement by said clamp, said tool comprising an elongated body, clamp engaging means at one end of the body, and a rebent strap supporting and holding means at the other end of said body.

3. A tool for applying emergency tire chains of the type having a clamp at one end and a strap at the other for engagement by said clamp, said tool comprising an elongated body, clamp engaging means at one end of the body, a rebent strap supporting and holding means at the other end of said body, and a transversely extending chain support carried by the body intermediate the ends thereof.

4. A tool for applying emergency tire chains of the type having a clamp at one end and a strap at the other for engagement by said clamp, said tool comprising an elongated body, clamp engaging means at one end of the body, a rebent strap supporting and holding means at the other end of said body, said strap supporting means being adjustable in length, and means to secure the strap supporting means in adjusted position.

5. A tool for applying emergency tire chains of the type having a clamp at one end and a strap at the other for engagement by said clamp, said tool comprising an elongated body, clamp engaging means at one end of the body, a rebent strap supporting and holding means at the other end of said body, said strap supporting means being adjustable in length, means to secure the strap supporting means in adjusted position, and a transversely extending chain support carried by the body intermediate the ends thereof.

6. A tool for applying emergency tire chains of the type having a clamp at one end and a strap at the other for engagement by said clamp, said tool comprising an elongated body, a handle at one end of the body and extending longitudinally thereof, a clamp engaging hook at the outer end of the handle, said hook and the handle cooperating to form a clamp tongue manipulating wrench, and a rebent strap supporting and holding means at the other end of said body.

7. A tool for applying emergency tire chains of the type having a clamp at one end and a strap at the other for engagement by said clamp, said tool comprising an elongated body, a handle at one end of the body and extending longitudinally thereof, a clamp engaging hook at the outer end of the handle, said hook and the handle cooperating to form a clamp tongue manipulating wrench, a rebent strap supporting and holding means at the other end of said body, and a transversely extending chain support carried by the body intermediate the ends thereof.

8. A tool for applying emergency tire chains of the type having a clamp at one end and a strap at the other for engagement by said clamp, said tool comprising an elongated body, a handle at one end of the body and extending longitudinally thereof, a clamp engaging hook at the outer end of the handle, said hook and the handle cooperating to form a clamp tongue manipulating wrench, a rebent strap supporting and holding means at the other end of said body, said strap supporting means being adjustable in length, and means to secure the strap supporting means in adjusted position.

9. A tool for applying emergency tire chains of the type having a clamp at one end and a strap at the other for engagement by said clamp, said tool comprising an elongated body, a handle at one end of the body and extending longitudinally thereof, a clamp engaging hook at the outer end of the handle, said hook and the handle cooperating to form a clamp tongue manipulating wrench, a rebent strap supporting and holding means at the other end of said body, said strap supporting means being adjustable in length, means to secure the strap supporting means in adjusted position, and a transversely extending chain support carried by the body intermediate the ends thereof.

10. A tool for applying emergency tire chains of the type having a clamp at one end and a strap at the other for engagement by said clamp, said tool comprising an elongated body, a handle at one end of the body and extending longitudinally thereof, a clamp engaging hook at the outer end of the handle, said hook and the handle cooperating to form a clamp tongue manipulating wrench, a strap supporting means extending downwardly from the other end of the body and having its lower part curved toward said handle, and a strap end engaging hook at the free extremity of the strap supporting means.

11. A tool for applying emergency tire chains of the type having a clamp at one end and a strap at the other for engagement by said clamp, said tool comprising an elongated body, a handle at one end of the body and extending longitudinally thereof, a clamp engaging hook at the outer end of the handle, said hook and the handle cooperating to form a clamp tongue manipulating wrench, a strap supporting means extending downwardly from the other end of the body and having its lower part curved toward said handle, a strap end engaging hook at the free extremity of the strap supporting means, said strap supporting means being adjustable in length, and means to secure the strap supporting means in adjusted position.

12. A tool for applying emergency tire chains of the type having a clamp at one end and a strap at the other for engaging with said clamp, said tool comprising an elongated body, a transversely extending chain support carried by the body intermediate the ends thereof, and a rebent strap supporting member extending downwardly from one end of said body and curved backwardly toward the other end of the body, said member being arranged to extend downwardly and outwardly around a tire upon the tool being in use.

13. In a tool for applying emergency tire chains having a chain portion and a strap portion, means for supporting said chain portion and means at an end of said first mentioned means to yieldingly clamp said strap portion.

14. In a tool for applying emergency tire chains having a chain portion and a strap portion, means for supporting said chain portion and means to yieldingly clamp said strap portion, said last mentioned means comprising a bent strip of spring metal adapted to form with an end of said first mentioned means a spring clamp.

FRANK D. LEWIS.